(12) United States Patent
Kastenholz

(10) Patent No.: US 7,940,763 B1
(45) Date of Patent: May 10, 2011

(54) AGGREGATED TOPOLOGICAL ROUTING

(75) Inventor: Frank J. Kastenholz, Chelmsford, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 125 days.

(21) Appl. No.: 12/104,134

(22) Filed: Apr. 16, 2008

Related U.S. Application Data

(63) Continuation of application No. 11/031,857, filed on Jan. 7, 2005, now Pat. No. 7,535,926.

(51) Int. Cl.
*H04L 12/28* (2006.01)
(52) U.S. Cl. ........................................ 370/389; 370/255
(58) Field of Classification Search .................. 370/238, 370/254, 255, 389, 392, 401, 410
See application file for complete search history.

(56) References Cited

U.S. PATENT DOCUMENTS

| | | | | |
|---|---|---|---|---|
| 5,805,578 A * | 9/1998 | Stirpe et al. | ........... | 370/255 |
| 6,240,074 B1 * | 5/2001 | Chandos et al. | ........... | 370/321 |
| 6,262,984 B1 * | 7/2001 | Rochberger | ........... | 370/395.2 |
| 6,493,765 B1 * | 12/2002 | Cunningham et al. | ........ | 709/245 |
| 6,501,760 B1 * | 12/2002 | Ohba et al. | ........... | 370/395.42 |
| 6,535,507 B1 * | 3/2003 | Li et al. | ........... | 370/356 |
| 6,578,087 B1 * | 6/2003 | Garakani et al. | ........... | 709/242 |
| 6,646,989 B1 * | 11/2003 | Khotimsky et al. | ........... | 370/238 |
| 6,778,531 B1 * | 8/2004 | Kodialam et al. | ........... | 370/390 |
| 6,850,519 B1 * | 2/2005 | Saito et al. | ........... | 370/389 |
| 6,973,102 B2 * | 12/2005 | Karagiannis et al. | ........ | 370/516 |
| 7,031,288 B2 * | 4/2006 | Ogier | ........... | 370/338 |
| 7,082,102 B1 * | 7/2006 | Wright | ........... | 370/229 |
| 7,123,620 B1 * | 10/2006 | Ma | ........... | 370/395.32 |
| 7,574,522 B2 * | 8/2009 | Oguchi | ........... | 709/238 |

* cited by examiner

*Primary Examiner* — Ricky Ngo
*Assistant Examiner* — Christine Ng
(74) *Attorney, Agent, or Firm* — Shumaker & Sieffert, P.A.

(57) ABSTRACT

Routing techniques are described that separate network topology information and management from network protocol addressing information, e.g., network prefixes, that network routers typically use during the packet forwarding process. The techniques provide separate topological identifiers to identify individual topological elements of the network, referred to as aggregates. A router within a network exchanges topological information with other routers that specifies routes for reaching destinations within a set of aggregates that represent topological elements of a network. In accordance with the topological information, the router generates forwarding information that associates the destinations with respective next hops within the network, and forwarding packets in accordance with the forwarding information.

42 Claims, 7 Drawing Sheets

AGGREGATED TOPOLOGICAL ROUTING

This application is a continuation of U.S. application Ser. No. 11/031,857, now U.S. Pat. No. 7,535,926, filed Jan. 7, 2005, the entire content of which is incorporated herein by reference.

TECHNICAL FIELD

The invention relates to computer networks and, more particularly, to techniques for routing packets within computer networks.

BACKGROUND

A computer network is a collection of interconnected computing devices that can exchange data and share resources. In a packet-based network, such as the Internet, the computing devices communicate data by dividing the data into small blocks called packets, which are individually routed across the network from a source device to a destination device. The destination device extracts the data from the packets and assembles the data into its original form. Dividing the data into packets enables the source device to resend only those individual packets that may be lost during transmission.

Certain devices, referred to as routers, maintain routing information that describes routes through the network. A "route" can generally be defined as a path between two locations on the network. Upon receiving an incoming packet, the router examines information within the packet and forwards the packet in accordance with the routing information.

In order to maintain an accurate representation of the network, routers periodically exchange routing information in accordance with a defined protocol. Large computer networks, such as the Internet, often include many routers grouped into administrative domains called "autonomous systems." A single autonomous system may have one or more destination network prefixes, i.e., ranges of globally unique network addresses. The routing information exchanged between routers of different autonomous systems typically describes a set of network routes for reaching various destination network prefixes. In this manner, the routing information links topological information of the network with network prefixes, which can be used by the routers to forward packets.

When two routers initially connect, they typically exchange all of their routing information. The routers send control messages to incrementally update the routing information when the network topology changes. For example, the routers may send update messages to advertise newly available routes, and to withdraw routes that are no longer available.

Conventional routers often maintain the routing information in the form of one or more routing tables or other data structures. Due to the complexity of the Internet, the storage and maintenance of routing tables tends to consume significant router resources. Typical routing tables include an entry for each network route available for each destination prefix. Consequently, as the size and interconnectedness of the Internet has exploded over the last several years, so has the size of the routing tables.

In addition, a change in network topology can require significant resources and network bandwidth for the routers to exchange corrected routing information. A single change in network topology may affect tens of thousands, if not hundreds of thousands, of individual routes. The communication of update messages identifying new routes to reach destination prefixes, as well as withdraw messages to remove routes that are no longer available, can consume considerable computing resources and substantially delay rerouting of packets.

SUMMARY

In general, the invention is directed to routing techniques that separate network topology information and management from addressing information for reaching network destinations, e.g., network prefixes, that is typically used during the packet forwarding process. The techniques provide separate topological identifiers at the routing protocol level to identify individual topological elements of the network, referred to as aggregates.

An aggregate may "contain" one or more lower-level networks. For example, an aggregate may contain individual destinations, such as local area networks (LANS), subnets, and the like, that are identified by specific network protocol address entities, such as network prefixes. In addition, an aggregate may be defined to contain other aggregates. The depth of the containment is not limited. In other words, there may be unlimited levels of containment defined within a network. Accordingly, the techniques allow network owners to hide the details of their internal topologies, yet maintain the desired levels of connectivity and reachability.

According to the described techniques, routers exchange reachability and topology information about aggregates, and use that information to build topology databases. As a separate mechanism, the routers exchange network protocol addressing information, such as lists of which network layer addresses, e.g., IPv4 prefixes, are contained by the aggregates.

In one embodiment, a method comprises receiving topological information specifying routes for reaching destinations within a set of aggregates that represent topological elements of a network, and generating forwarding information that associates the destinations with respective next hops within the network. The method further comprises forwarding packets in accordance with the forwarding information.

In another embodiment, a routing device comprises a topology management module to receive topological information specifying routes for reaching destinations within a set of aggregates that represent topological elements of a network. The router further comprises a destination management module to generate forwarding information that associates the destinations with respective next hops within the network, and a control unit to forwarding packets in accordance with the forwarding information.

In another embodiment, a method comprises maintaining topological information specifying routes for reaching destinations within a set of aggregates that represent topological elements of a network, and partitioning one of the aggregates into at least two new aggregates in response to a network event within the topological element represented by the aggregate.

In another embodiment, a method comprises receiving topological information specifying routes for reaching destinations within a set of aggregates that represent topological elements of a network, and defining a set of policies. The method further comprises generating forwarding information that associates the destinations with respective next hops within the network based on the set of policies; and forwarding packets in accordance with the forwarding information.

In another embodiment, a computer-readable medium comprises instructions to cause a processor to receive topological information specifying routes for reaching destinations within a set of aggregates that represent topological elements of a network, and generate forwarding information that associates the destinations with respective next hops within the network. The medium further comprises instructions to cause the processor to forward packets in accordance with the forwarding information.

In another embodiment, a computer-readable medium comprises topology information specifying routes for reaching destinations within a set of aggregates that represent topological elements of a network, and forwarding information to control a packet-forwarding process of a router. The forwarding information associates the destinations with respective next hops within the network and excludes the aggregate identifiers.

The invention may provide one or more advantages. For example, according to the techniques, groups of otherwise separate destinations, such as IP prefixes, can be combined and treated as a single aggregate. This may result in savings of routing resources, e.g., network bandwidth and computing power. The techniques can be used to define many hierarchical levels of aggregation, allowing the internal details of an aggregate to be hidden from parent and peer aggregates. Consequently, the techniques can limit the complexity of external routing information communicated to, and maintained by, routers.

Further, the computational and communications resources needed to implement the routing and addressing techniques described herein may grow at rates that are decoupled from the rate of growth of network destinations. By this decoupling, the techniques allow the resource requirements for routing and addressing to grow much more slowly than the growth rate of the destination information, e.g., slower than the growth rate of network prefixes.

In addition, the techniques may reduce the convergence time of routing tables in the event of change of network topology. By limiting the topology representation within the topology database to aggregates, and not individual network protocol entities such as network prefixes, the techniques may keep the topology database smaller than with conventional routing techniques. Furthermore, in the event of a network change, a router need only perform a single topology calculation for the aggregation, and then apply the result to all of the network-layer entities contained in the aggregate.

The separate routing-level topological identifiers place no restrictions on the network-layer protocols that can be addressed or forwarded. Accordingly, the routing architecture can be readily implemented in concert with the Internet Protocol version 4 (IPv4), IPv6, and other network-layer protocols that might be developed in the future.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
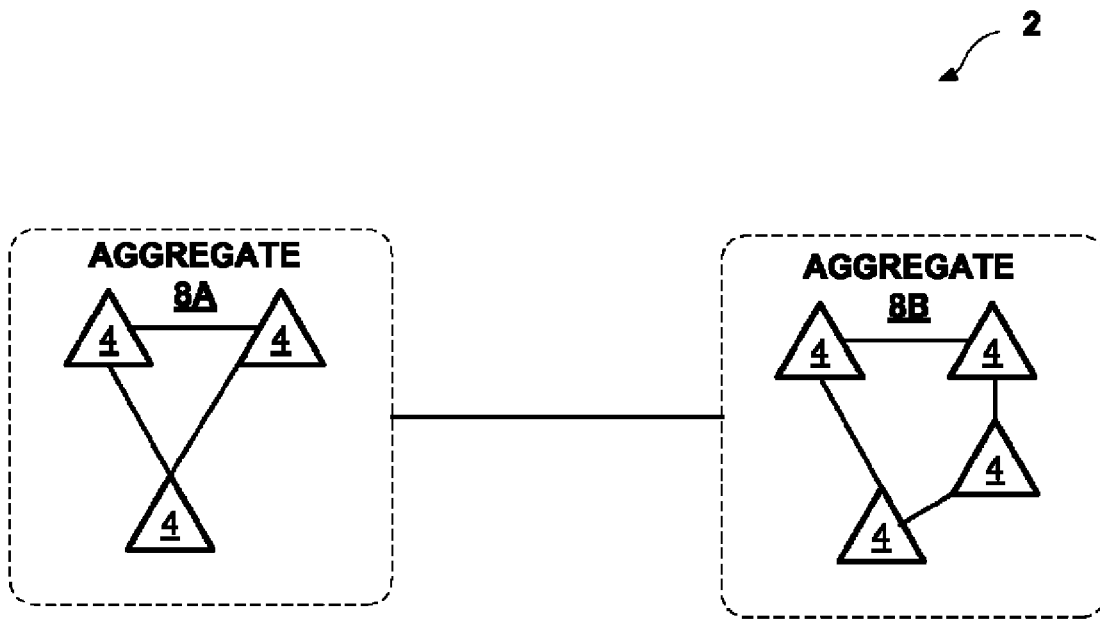
FIG. 1 is a block diagram illustrating an example network in which destinations are contained within a set of aggregated topological elements, referred to as aggregates.

FIG. 1 is a block diagram illustrating an example network 2 in which network destinations 4 are contained within aggregate 8A and aggregate 8B (collectively aggregates 8). As described herein, aggregates 8 operate in accordance with routing techniques that separate network topology information and management from network protocol addressing information that describes destinations 4.

According to the techniques, each of aggregates 8 is associated with a unique topological identifier at the routing protocol level, and represents individual topological elements of network 2. Accordingly, aggregates 8 represent a set of topological objects, and have their own name space. Routing algorithms and protocols use these topological objects to determine the topology of network 2.

In general, each of aggregates 8 may contain zero or more destinations 4. In the illustrated example, aggregates 8A, 8B contains three and four destinations 4, respectively. Destinations 4 represent local area networks (LANS), subnets, and the like, that are identified by specific network protocol entities, such as network prefixes.

According to the described techniques, routers within aggregates 8 exchange reachability and topology information for the aggregates, and use that information to build topology databases. As a separate mechanism, either as a separate operation within a common protocol or via one or more other protocols, routers within aggregates 8 exchange network protocol addressing information, such as lists of which network layer addresses, e.g., IPv4 prefixes, for destinations 4 contained by the aggregates 8. The routers determine the paths to reach aggregates 8 using any desired routing algorithms, such as shortest-path, and generate forwarding information in accordance with the determined paths for use during the packet-forwarding process.

Each of aggregates 8 is associated with a unique aggregate identifier. This association may occur manually, e.g., via system administrators, or automatically, e.g., by an aggregation protocol or other mechanism. Although aggregate identifiers may be globally unique, they need not be. For example, it is possible that an aggregate 8 may have limited "scope," i.e., visibility. As described below, an aggregate 8 may be "hidden" within another aggregate. Accordingly, an aggregate identifier need only be unique within its scope. However, as a result of certain events, a "hidden" aggregate can become "unhidden". As a result, globally unique aggregate identifiers may be preferred, although the unhidden aggregate may be renamed.

Aggregate identifiers may comprise unstructured values that simply provide unique identifiers for the aggregates and have no topological significance. In other words, an aggregate identifier need not define the position of the respective aggregate within the topology of the network. That is, topology information need not be inferable from the identifier of a given aggregate. In addition, the identifier need not contain information regarding the particular destinations or child aggregates within the aggregate. The aggregate identifiers may be defined to conform to any one of a variety of formats, e.g., text strings, hierarchical numbers, floating point numbers, and the like. However, the techniques do not prohibit structured naming of aggregates 8. For example, there may be environments where local optimizations allow aggregate identifiers to be hierarchically delegated from parent aggregates to child aggregates.

The aggregate identifiers do not to appear in traffic forwarded within network 2. In other words, the control logic within routers for forwarding packets in accordance with these techniques are not aware of the aggregate identifiers, and do not use the identifiers in making forwarding decisions. Aggregate identifiers appear only as data in the routing protocols and typically only by the routing algorithms. Thus, their form and structure may be optimized for routing.

Aggregate identifiers may include a partition field. Partitioning of an aggregate may occur when one or more topology changes occur such that it is no longer possible to get from one part of the aggregate to another without leaving the aggregate. In this case, the aggregate may partition itself into two or more aggregates. The aggregate identifier can be used to indicate which partition of an aggregate is being referred to after the partitioning process.

Each of destinations 4 is assigned a destination identifier from a name space that is distinct from the name space for the aggregate identifiers. Packets traversing network 2 carry information identifying a particular destination. Routers within aggregates 8 use the destination identifiers as keys during the forwarding process to forward the packets to identified next hops within network 2.

The destination identifiers may be globally unique. Alternatively, as described below, policy mechanisms may be used to control the "scope" of a destination identifier by hiding the visibility of the destination. In this case, the destination identifier need only be unique within their visible scope.

The exact structure of a destination identifier depends on the mechanism, such as a lower layer protocol, for exchanging destination information. In the Internet, in which networks typically use IPv4 and IPv6, destination identifiers are typically IP address prefixes.

In one embodiment, the routing techniques described herein make use of a destination identifier comprising a first part, and an optional second part. Specifically, the destination identifiers contain a destination name, and may contain a forwarding tag. The destination name itself may comprise multiple parts.

Since the techniques may support different network layer protocols and forwarding models, e.g., IPv4 and IPv6, the destination names may be allocated out of the different network layer address spaces. Therefore, destination names may have two parts, a format identifier and a value. The format identifier identifies the name space from which the value was allocated, and the format, size, and structure of the value. Example format identifiers include: (1) IPv4—indicating the value for the destination name represents an IPv4 prefix, (2) IPv6—indicating the value represents an IPv6 prefix, and (3) NoProto—indicating the value is not allocated out of any network layer protocol.

The optional second part of the destination identifier, i.e., the forwarding tag, is an identifier used to forward packets to the named destination. The forwarding tag has a type/value syntax in which the type indicates the format of the tag, such as IPv4, IPv6, MPLS label, and the like, and the value represents the actual forwarding value, such as the actual IP prefix or MPLS label stack. The forwarding tag is optional in the sense that it may be present when the destination name can be used for forwarding, such as with IPv4 prefixes. If so, the value of the tag may be different from the value in the destination name, in which case a policy setting or other mechanism may be used to select between the two. For destination identifiers in which the name specifies a NoProto format, the forwarding tag is required. Routers may change the forwarding tag as the destination identifier is propagated through the network, e.g., when the forwarding tag comprises an MPLS label.

When the underlying network layer protocol(s) allow it, multiple destination identifiers may be merged together into a single destination identifier. For example, if destinations are IPv4 subnets with addresses 10.[0 . . . 255]/16, the prefixes may be super-netted into 10/8 so that one destination identifier is used, rather than 256.

Multicast addressing may be layered on top of the techniques described herein. For example, multicast routing protocols could use a topology database generated by the techniques to determine how to build a distribution tree. In particular, the hierarchy of the aggregates can be used as a basis for the multicast distribution tree.

Figure 2:
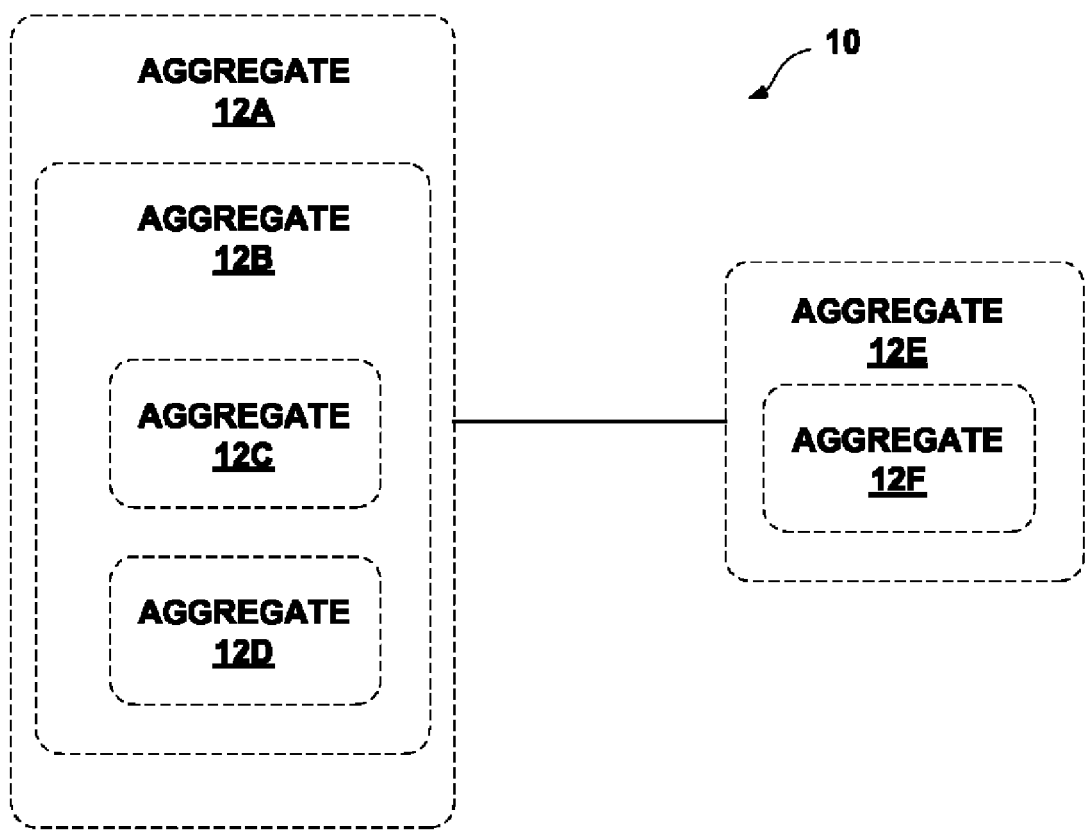
FIG. 2 is a block diagram illustrating another exemplary network having aggregates.

FIG. 2 is a block diagram illustrating another exemplary network 10 having aggregated topological elements. In particular, network 10 includes aggregates 12A-12F, and illustrates the principle that an aggregate may be defined to contain other aggregates. For exemplary purposes, individual network protocol destinations are not shown within aggregates 12.

In the illustrated example, aggregate 8A contains aggregate 12B, which in turn contains aggregates 12C, 12D. According to the principles of the invention, there may be unlimited levels of containment defined within a network. Accordingly, the techniques allow network owners to hide the details of their internal topologies, yet maintain the desired levels of connectivity and reachability.

An aggregate that is contained in another aggregate is referred to as a child aggregate or sub-aggregate. For example, aggregates 12C and 12D are children of aggregate 12B, which in turn is a child aggregate of aggregate 12A. Aggregates that have the same parent aggregate are referred to as peer aggregates, e.g., aggregates 12C and 12D.

An aggregate may be contained in more than one aggregate, i.e., an aggregate may have more than one parent. Aggregates that are parents, children, or peers of a particular aggregate are considered "adjacent" to that aggregate. Aggregates that are not adjacent are "distant." For example, aggregates 12C, 12D, and 12F are distant from aggregate 12A. Similarly, aggregates 12E, 12F are distant from aggregate 12B. 12A, 12E and 12F are distant from aggregates 12C, 12D. Aggregates 12B, 12C and 12D are distant from aggregate 12E. Aggregates 12A, 12B, 12C and 12D are distant from aggregate 12F.

An aggregate learns topological information and network protocol addressing information about its adjacent aggregates directly from those adjacent aggregates. For distant aggregates, an aggregate learns topological information and network protocol addressing information indirectly, e.g., via its peers, parents, or children. For example, aggregates 12C, 12D receive such information for aggregates 12A, 12E and 12F from their parent aggregate 12B.

In general, aggregates are presumed to be fully internally interconnected. That is, assuming no network failures, network traffic can be forwarded between any two destinations within a given aggregate without traversing any network element that is external to the aggregate. A network failure or set of failures, however, may partition an aggregate, as described below.

Generally, the topology within an aggregate is hidden from external view. However, when an aggregate contains one or more child aggregates, the destinations contained within the child aggregates, and recursively within any lower-level child aggregates, are not hidden from the parent. For example, child aggregates 12C, 12D inform parent aggregate 12B as to their respectively contained destinations. Similarly, aggregate 12B informs aggregate 12A as to its contained destinations, as well as the destinations contained within aggregates 12C, 12D. However, the parent aggregate may hide the existence of a child aggregate as a separate and distinct entity. For example, although aggregate 12B informs aggregate 12A as to the contained destinations, including the destinations within aggregates 12C, 12D, aggregate 12B may hide from aggregate 12A the knowledge that some of the destinations are contained within child aggregates, i.e., aggregates 12C, 12D. As described below, setting one or more policies within a given parent aggregate may control the extent to which parent aggregates hide child aggregates.

In the event a parent does not hide the existence of child aggregates, the parent may nevertheless hide the topological relationships of the child aggregates. By hiding this information, the techniques reduce the amount of topological data that is seen by network resources external from the parent aggregate. Accordingly, the techniques may reduce the complexity of the topology graphs contained in routers outside of the parent aggregate. In this manner, the techniques may reduce the computational loads on the processors of those routers, and may generally lead to improved scalability of the network.

In addition, the internal topology of an aggregate may be visible in an abstract fashion. In other words, the aggregate may make some aspects of its internal topology visible via, e.g., embedding content attribute tags in content advertisements described below. For example, an aggregate border router (ABR) for an aggregate may embed hop counts for the contained destinations as a metric indicating the distance to reach each destination. If an administrator does not wish to export even this information, the ABR may be configured to embed constant metrics within the advertisements.

Figure 3:
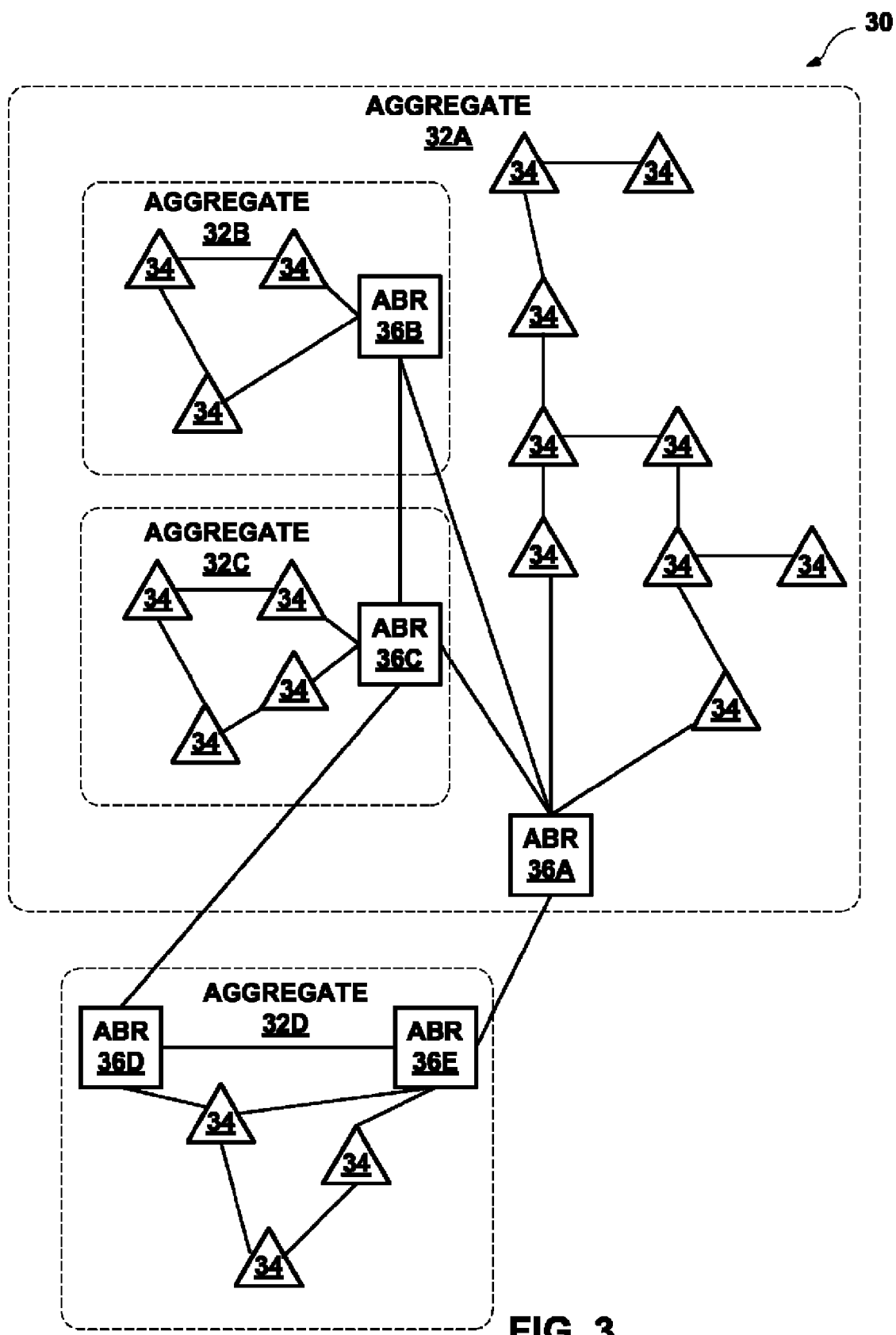
FIG. 3 is a block diagram illustrating an exemplary network in which aggregates incorporate aggregate border routers (ABR) for exchanging of topological information as well as network protocol addressing information.

FIG. 3 is a block diagram illustrating another exemplary network 30 in which aggregates 32A-32D incorporate aggregate border routers (ABR) 36A-36E for exchanging of topological information, as well as network protocol addressing information in accordance with the principles of the invention. An ABR is a router, switch, or other network device by which an aggregate interacts with other aggregates. Each aggregate may have zero or more ABRs. For example, aggregate 32A has a single ABR 36A, while aggregate 32D incorporates two ABRs 36D, 36E.

In general, each ABR 36 establishes relationships, referred to as "peering" relationships, with other ABRs 36 in the other aggregates with which they are connected. A given one of ABRs 36 may establish peering relationships to multiple other ABRs 36 that may be located in one or more other aggregates 32. Furthermore, a peering relationship is a bi-directional relationship. That is, if a first ABR has a peering relationship with a second ABR, then the second ABR also has one with the first.

Relationships between ABRs 36 belonging to different aggregates 32 are referred to as "external" peering relationships. External ABR peering may be point-to-point between ABRs of two different aggregates, e.g., ABRs 36A, 36B. The two ABRs of a peering relationship may share a link. The two ABRs of a peering relationship may be the respective ends of a point-to-point link, or have connections to a common multiple-access link such as Ethernet. In an external peering relationship, each ABR of the relationship can be the next hop to a set of destinations from the other ABR of the relationship.

For example, ABR 36A can maintain peering relationships with ABRs 36B, 36C and 36E. ABR 36B can maintain peering relationships with ABRs 36A and 36C. ABR 36C has established peering relationships with ABRs 36A and 36B. ABR 36D can maintain a peering relationship with ABR 36C. Finally, ABR 36E can maintain a peering relationship with ABR 36A.

In addition to establishing "external" relationships with each other, ABRs 36 may also establish internal relationships with other ABRs. For example, ABRs 36D, 36E belong to a common aggregate 32D, and establish an internal peering relationship. An internal ABR peering relationship controls the interaction of ABRs within a single aggregate, and may be established across one or more of the elements contained within the aggregate, e.g., across internal subnets, point-to-point links, sub-aggregates, internal routers, and the like.

The internal peering relationships can have any structure and topology, so long as all of the ABRs of the aggregate are reachable, and information can be passed from one ABR to all of the others of the aggregate. The internal topology may be any combination of point-to-point and point-to-multipoint links and paths. The internal ABRs do not need to be directly connected to each other. Furthermore, the set of ABRs do not need to be fully interconnected, and it is not necessary for one ABR of an aggregate to have direct connections to each other ABRs of the aggregate.

When two ABRs of a common aggregate initially communicate, the internal peers exchange all of their topological and lower-level network protocol information with which they have been configured, that they have learned from other internal-peers, and that they have learned from their external peers. In this way, all ABRs of a given aggregate have the same information.

Not all ABRs 36 of network 30 need establish peering relationships, but a complete set of peering relationships should define at least one path to reach any of ABRs 36 from any other ABR 36, directly or via multiple hops. The human administrators of each aggregate 32 may manually configure the peering relationship between ABRs 36.

Each of ABRs 36 select paths for reaching various destinations that are outside of their corresponding aggregates 32A-32D, and inject that information into the routing protocols operating within the aggregate. For example, ABR 36A of aggregate 32A selects paths to reach destinations 34 of aggregates 36B-36D. ABR 36A injects that information into the routing protocols used within aggregate 36A.

Each of ABRs 36 performs content discovery and topology discovery via the peering relationships that it maintains. As described in more detail below, each ABR 36 maintains a topology information base (TIB) to store the discovered topology information as a graph in which the nodes of the graph represent aggregates 32, and the arcs represent the links between aggregates 32. Furthermore, each ABR 36 stores the discovered content information, e.g., the discovered destinations of the aggregates 32, within the nodes of the graph.

With respect to content discovery, each ABR 36 is responsible for: (1) learning the internal contents, e.g., destinations, of the aggregate 32 within which the ABR 36 is contained, (2) advertising the contents to the ABRs 36 of the other aggregates 32, (3) receiving the content advertisements from the peered ABRs 36 of the other aggregates 32, (4), advertising the content information for other aggregates 32 into the aggregate 32 to which it belongs, including forwarding the information to other ABRs 36 within the same aggregate 32, and (5) relaying the content information to other ABRs 36.

For example, ABR 36B advertises content information describing the destinations 34 within aggregate 32B to ABRS 36A, 36B. Similarly, ABR 36C advertises content information describing the destinations 34 within aggregate 32C to ABRS 36A, 36B, and 36D. ABR 36A advertises content information of aggregates 32A, 32B, 32C to ABRs 36E. ABR 36D advertises content information of aggregate 32D to ABR 36C, and advertises content information of aggregate 32D to ABRs 36B, 36C. ABR 36E advertises content information for aggregate 32D to ABR 36A.

An ABR 36 may learn content information for the aggregate 32 to which it belongs in a number of ways. For example, the ABR 36 may be manually configured in the sense that administrators manually enter content information. An ABR 36 may learn content information from an internal routing protocol, such as IPv4 or IPv6. In addition, an ABR may learn the content information from ABRs of child aggregates. In other words, content advertisements from ABRs of child aggregates inform the ABR as to the contents of the child aggregates. The parent ABR can separately advertise the child aggregate and its contents, or fold the contents of the child aggregate into its content information for unified content advertising.

In one embodiment, a content advertisement may indicate whether a given destination or sub-aggregate is currently reachable. For example, a content advertisement may include a single bit for each destination or sub-aggregate of the corresponding aggregate to which the advertisement contains in order to indicate whether the destination or sub-aggregate is currently reachable.

Normally, the internal topology of an aggregate 32 is completely hidden from the outside. Furthermore, typical default topology of an aggregate 32 and data transit policies may be set to cause ABRs 36 to forward traffic received on any external link to the specified destinations 34. In other words, from the outside, aggregates 32 may appear as black boxes.

Under local configuration and policy control, an aggregate 32 may be changed, and the topology advertisements produced by the aggregate 32 are altered to include abstractions of the internal topology of the aggregate 32. For example, the aggregate 32 may wish to advertise different metrics between various link pairs by advertising a metric for each path.

The content advertisements may incorporate a number of metrics to influence topology calculation and path selection. Example uses of metrics include: (1) link metrics, (2) aggregate metrics to bias the flow of transit traffic to or away from a particular aggregate 32, (3) destination metrics to bias traffic to certain destinations 34 toward or away from the aggregate 32, e.g., when a destination 34 is multi-homed and the system administrator wishes to have traffic reach destination via a "primary" service provider, (4) destination/entry-point pairs to bias traffic for certain destinations 34 in an aggregate 32 toward or away from certain entry points, e.g., to force traffic destined for a particular destination 34 to flow through an entry point "nearest" that destination 34, (5) entry points metrics to bias traffic toward or away from a specific entry point regardless of the destination 34 of the traffic.

Metrics may be expressed, for example, as a finite numeric range, e.g., 1 to 255. In addition, metrics may be expressed as two "special" values for the metrics: (1) Infinity to indicate that the item with which the metric is associated is unreachable or unusable, and (2) Very Large to indicate that the item is reachable, but is not to be used unless no other path or aggregate 32 is available.

Upon receiving a content advertisement, ABRs 36 record the ABR 36 from which the advertisement was received prevent the content advertisement from looping through the network and consuming vast resources. Upon receiving the content advertisement from a second ABR 36, the receiving ABR 36 does not forward the advertisement to other ABRs 36 from which the receiving ABR 36 already received the advertisement or sent the advertisement. For example, assume that ABRs 36D and 36A both forward the content information for aggregate 32D to ABR 36C. In this situation, ABR 36C does not forward the content information back to either ABR 36A or ABR 36D, and forwards only a single copy of the advertisement to ABR 36B.

In some situations, advertisement loops can be formed due to malice, software errors, or configuration errors. For example, when a parent aggregate 32 advertises the individual child aggregates 32, the containment loop can lead to an infinite nesting of aggregates. For example, consider the situation when ABR 36A and ABR 36B each advertise their respective aggregates 32A, 32B. For example, at time T1, ABR 36A advertises to ABR 36B that aggregate 32A contains aggregate 32B. At time T2, ABR 36B, believing that it contains aggregate 32A, and learning from the previous advertisement that aggregate 32A contains aggregate 32B, advertises to ABR 36A that it contains aggregate 32A, which in turn contains aggregate 32B. Without loop prevention, the containment messages advertising topological information between aggregates 36A, 36B, grow without bound in terms of number and length. However, ABRs 36 can detect such loop by examining the containment list for the aggregate in which it is contained. Upon seeing its aggregate within an advertised list of hierarchical aggregates, an ABR 36 knows that a loop condition exists, and everything after the list can be discarded. In addition, network operations staff can be informed of the presence of the loop.

Such infinite loops may be altogether avoided in environments where aggregates 36 take the responsibility of advertising the contents of their contained aggregates 36. For example, if at a time T1 ABR 36B advertises to ABR 36A that aggregate 32B contains a particular destination 35. ABR 36A, believing that it contains aggregate 32B, adopts destination 35 as its own. At time T2 ABR 36A advertises to ABR 36B that aggregate 32A contains destination 35. ABR 36B, knowing that aggregate 32B contains destination 35, does nothing. Accordingly, no infinite list grows.

In addition to content discovery, each ABR 36 discovers the topology of aggregates 32 within network 30, and builds a graph to represent that topology. With respect to topology discovery, each ABR 36 is responsible for (1) identifying the other aggregates 32 that are connected to the aggregate within which it is contained, (2) receiving topology information from its peers (internal and external), (3) transmitting topology information to its peers (internal and external), (4) relaying topology information relating to distant aggregates 32, (5) and building topology graphs out of the received information.

The support of hierarchical aggregation allows for the removing the sub-aggregates from the topology graph as seen by the peers of a parent aggregate. For example, the topology graphs maintained by ABRs 36D, 36E may be significantly reduced if ABRs 36A, 36C hide the topology, e.g., by assuming responsibility for advertising topology information and content information for aggregates 32C, 32D. In other word, the graphs need not include detailed topological information for aggregates 36B, 36C, thereby saving processor execution cycles and memory space.

More specifically, ABRs 36 advertise contents of aggregates 32 in one of two ways. Using a "combined aggregation" technique, an ABR 36 of a parent aggregate 32 combines the contents of the Child Aggregates into a single content advertisement of its own. In this manner, the child aggregates are then no longer seen by any external aggregates. Using a "discrete aggregation" technique, the parent aggregate maintains the existence of the child aggregates. Here, the parent advertises that it contains the child aggregate(s), and forwards externally the content advertisement of each child.

An ABR 36 need not use all of one technique or the other. In particular, an ABR may use a mixed-mode in which some of the sub-aggregates are hidden, while others are discreetly advertised. The choice of which method, or which combination of methods, can be a local policy decision, e.g., as configured by a system administrator.

ABRs 36 may use cryptographic techniques to securely establish the peering relationships, and to authenticate ABRs. For example, each of ABRs 36 may be assigned a digital signature or other digital credential as, for example, issued by a certification authority of a trusted hierarchy for digitally signing content advertisements. These techniques may prevent attackers from establishing unexpected or non-allowed peering relationships, or from masquerading as a valid peer, thereby preventing or reducing the likelihood of an attack on network 30.

Figure 4:
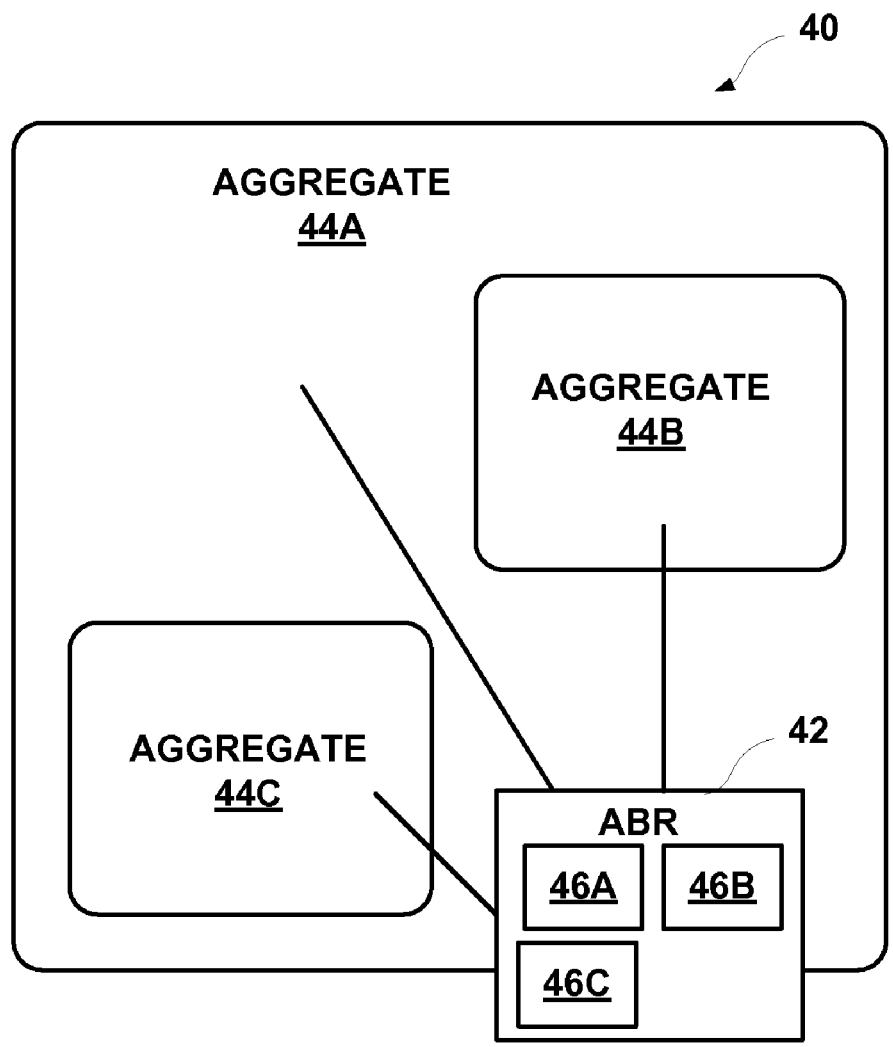
FIG. 4 is a block diagram illustrating an exemplary network in which a single ABR services a plurality of aggregate topological elements.

FIG. 4 is a block diagram illustrating another exemplary network 40 in which a single aggregate border router (ABR) 42 services a plurality of aggregates 44A-44C. As illustrated, a single ABR 42 may serve more than one aggregate 44, and these aggregates may be at multiple levels of an aggregated topological hierarchy. ABR 42 may maintain three sets of state 44, one for each of aggregates 44. Accordingly, ABR 42 may act as three independent ABRs 42A-42C. States 46A-46C may include a variety of information for the respective aggregates 44, including destinations information, link information, and the like.

Figure 5:
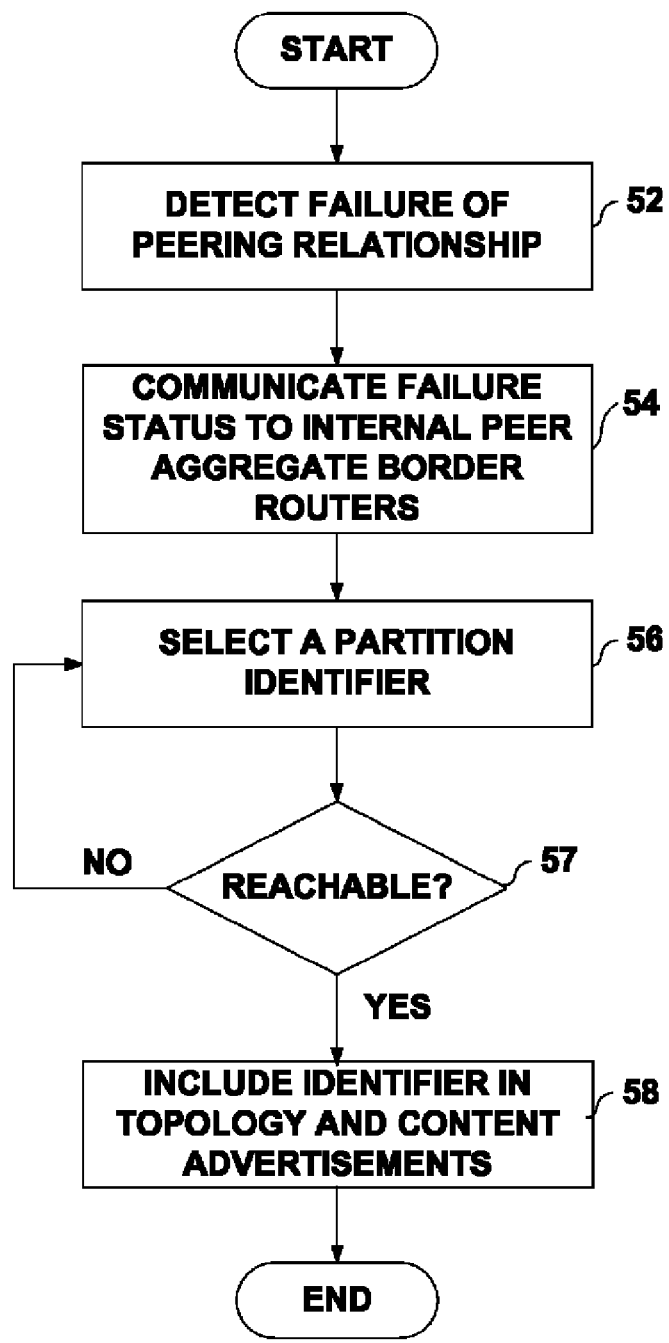
FIG. 5 is a flowchart illustrating example operation of ABRs to partition an aggregate upon detecting failure of an internal peering relationship.

FIG. 5 is a flowchart illustrating example operation of ABRs to partition an aggregate upon detecting failure of an internal peering relationship. Initially, the ABR detects when one of their internal peering relationships fails, possibly by use of keep-alive messages or other mechanism (52). Upon detecting the failure, the detecting ABR communicates the status to all other ABRs within the aggregate, if any (54). Accordingly, each ABR may keep track of all of the internal peering relationships within the aggregate.

Next, the ABRs cooperate to select a partition identifier for partitioning the aggregate (56). For example, the ABRs within the aggregate may automatically attempt to use the lowest identifier associated with the ABRs as the partition identifier. If the ABR whose identifier is used as the partition identifier is no longer reachable, then the remaining ABRs may repeat the process to select a new partition identifier (57). The ABRs include the selected identifier in all the topology and content advertisements (58). For example, the identifier may comprise an integer number that is added or appended to the aggregate identifier in all the topology and content advertisements.

Figure 6:
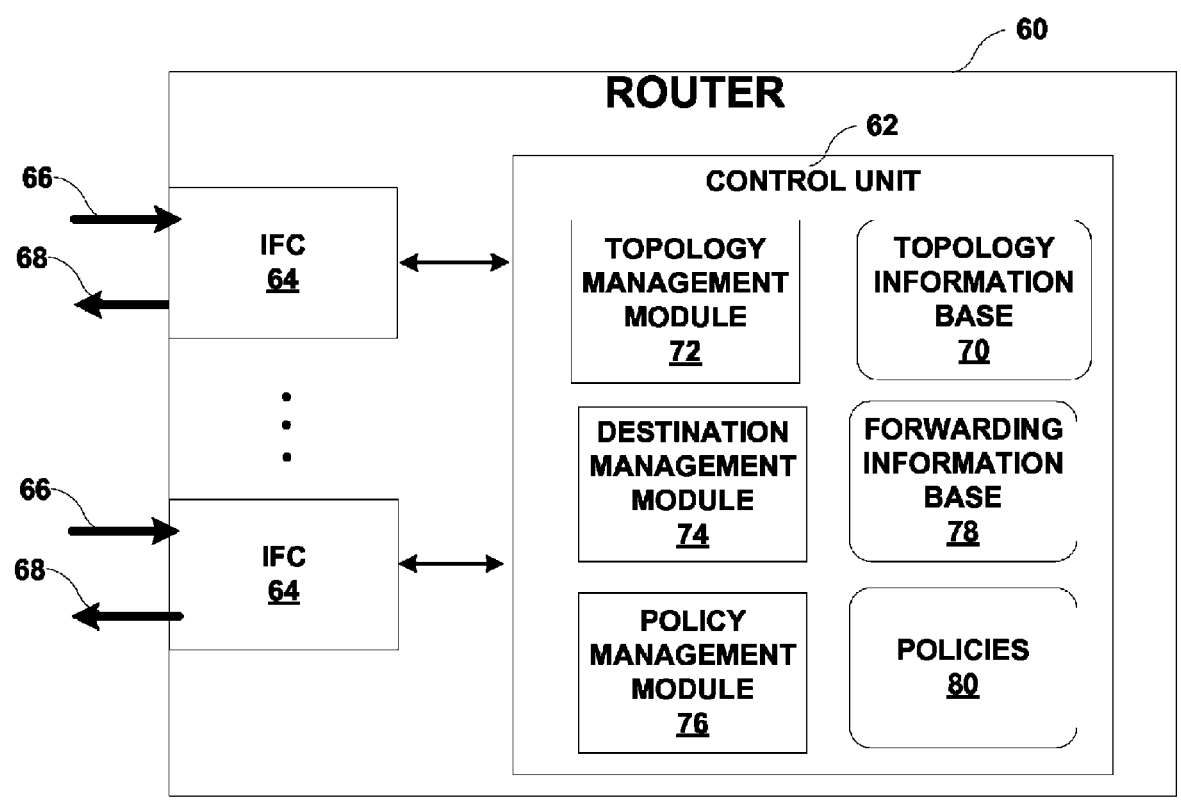
FIG. 6 is a block diagram of an example embodiment of a router that operates in accordance with the routing techniques described herein.

FIG. 6 is a block diagram of an example embodiment of a router 60 that operates in accordance with the routing techniques described herein. In the exemplary embodiment, router 60 includes interface cards (IFCs) 64 for communicating packets via network links 66 and 68. IFCs 64 are typically coupled to network links 66, 68 via corresponding physical interface ports. Router 60 includes a control unit 62 that includes a topology management module 72, a destination management module 74, and a policy management module 76.

Topology management module 72 acquires topological information from peer routers, and stores the topology information within topology information base (TIB) 70. In this manner, TIB 70 represents a set of data structures within a router that contains the topology information known to the router. TIB 70 contains both "local" information describing destinations with which router 60 is connected, and destination within the respective aggregate within which router 60 resides. In addition, TIB 70 includes "distant" information describing other aggregates within the network. In other words, TIB 70 can be limited to aggregates and inter-aggregate links.

Although the exact format and structure may vary based upon the type of path selection algorithm employed, TIB 70 generally stores information describing the aggregates within the network, their organization, and the communication links between them. If router 60 employs a path-vector algorithm, the TIB 70 includes the topology advertisements received from peer routers that describe all of the available paths for reaching each aggregate. If topology management module 72 employs a distance-vector algorithm, TIB 70 includes all of the advertised information that describes next-hops to the individual aggregates of the network.

If topology management module 72 uses a link-state algorithm, TIB 70 represents a link-state graph in which the nodes of the graph represent the aggregates of the network, and the arcs represent the peering relationships between the aggregates. The destination identifiers of the destinations within each aggregate may be stored within the graph as attributes of the nodes.

Each arc and each node may have a number of associated attributes, such as physical parameters of a link, e.g., bandwidth and delay. In addition, each arc may be assigned a stage, such as UP or DOWN, depending upon the current state of the corresponding peering relationship. An arc may be considered UP so long as the corresponding peering relationship is established. However, if either of the ABRs for the peering relationship, or their physical interfaces, is down, or if the physical or logical medium connecting the ABRs is out of service, then topology management module 72 may set the state of the arc to DOWN.

In accordance with these techniques, router 60 may be able to discriminate between link-failures and structural changes in the network, and can treat each case differently. For example, routers may execute more aggressive hold-downs in the face of link-failures. In addition, routers may be able to cache pre-failure state, and can quickly update TIB 70 when service is restored.

Destination management module 74 maps specific network destinations to topological elements, and generates forwarding information base (FIB) 78 in accordance to reflect the mapping for use by control unit 40 to forward packets. In particular, destination management module 74 generates FIB 78 in accordance with TIB 70 in view of policies 80.

FIB 78 associates next hops with interfaces ports of IFCs 64 that couple router 60 to network links 66,68. Control unit 62 uses receives packets from interface cards 64, uses destination identifiers for the packets as the lookup-keys for FIB 78, and forwards the packets to output ports of IFCs 64 in accordance with the lookup.

Destination management module 74 determines the next hop that is appropriate for each destination of each aggregate defined within TIB 70, and creates an entry in FIB 78 for each destination within each of the known aggregates. Destination management module 74 constructs FIB 78 such that the next hop for a given destination is that same as the next-hop for the corresponding aggregate within which the destination resides. When a destination appears in multiple aggregates, destination management module 74 may either uses both paths, or may select one of the paths, based on policy information 60. When creating FIB 78, destination management module 74 also considers interior routing protocols, static routes, and similar information.

Since each aggregate represents many destinations, the size and complexity of TIB 70 is not a function of the number of destinations, e.g., IP prefixes, reachable via the network. This may provide one or more advantages. First, the resources required by router 60 to store and process TIB 70 may be reduced. Second, for each iteration of the topology calculation, destination management module 74 may generate forwarding entries of FIB 78 for many destinations. Accordingly, the cost of each topology calculation can be reduced, and the number of such calculations required can also reduced. Third, the amount of routing protocol traffic required when there is a topology change is a function of the number of aggregates affected by the change, not the number of destinations, as with many conventional protocols. This may significantly reduce routing protocol traffic.

Policy management module 76 maintains policies 80 that alter the basic route calculations and path selections performed by control unit 62. In general, policies 80 take one of two forms: (1) filters for selectively limiting the forwarding of specified packet flows, and (2) preferences for controlling path selection.

For example, policy management module 76 may install filtering policies to prohibit packets to a specified destination from traversing a certain network element. Accordingly, filtering policies may be used to specify whether an aggregate provides transit services for traffic traversing a network from a particular source to a particular destination that both are not contained within the aggregate. As described above, the techniques described herein are inherently network-protocol-neutral in that any mechanism may be used for disseminating forwarding information. However, in some environment, an aggregate may not be able to, or may not wish to, forward traffic for certain network-layer protocols. Similarly, an aggregate may only provide limited forwarding service, e.g., between some of the peers of the aggregate but not all. In these environments, filters may be used to indicate support on a per-network protocol basis, e.g., "support" for IPv4, and "no support" for IPv6. The filters may further indicate support on a per peering-relationship basis e.g., support for IPv6 between peers 1 and 2, but no others.

Filtering may also be used to limit the destinations for which the aggregate will provide transit service, although still allowing traffic to reach a particular destination. A filter may also be used to specify that traffic destined for a particular destination should not traverse one or more specified aggregate. In this example, if the undesired path is the only one available, the destination may become unreachable upon installation of the filter within policies 80 via policy management module 76.

One use of preferences by policy management module is to control path reordering, which allows an administrator to specify that certain paths within a network element are to be preferred over other paths. If the more-preferred paths become unusable, e.g., in response to a link failure, then control unit 62 may automatically use the less-preferred paths. As another example, similar preferences may be used to allow a multi-homed destination to indicate a preferred "home," e.g., that one service provider is a primary while a second service provider is a backup.

As another example, a preference may be installed within policies 80 to specify which of a set of links traffic from external network sources should use to enter an aggregate. For example, preferences may be created to force traffic to enter an aggregate via links closest to the destinations for which the packets are seeking.

Other example uses for preferences includes: (1) selection of peer routers to which routing information will be transmitted, (2) specification of the granularity and type of transmitted routing information, e.g., specification of the length of IPv4 prefixes, (3) selection of a level of security and authenticity for the transmitted routing information, and (4) a preference indicating that an ABR should use all available paths to carry traffic to a particular aggregate. To support this last policy, routing protocols or other technique is used to find and use multiple equivalent paths to a destination, and the ABRs for a network support some form of equal-cost, multi-path (ECMP) forwarding to balance the traffic across the multiple paths.

To ease configuration and policy setting, policy management module 76 may support the association of aggregations into administrative domains (ADs). In particular, an AD is a collection of one or more aggregates, destinations, or both, that are under the control of a single administrative entity. This allows the administrative entity to readily set a single coherent set of policies for an administrative domain.

In accordance with policies 80, control unit 62 may filter or otherwise alter content advertisements received by router 60 prior to forwarding the content advertisements to other peer ABRs. Consequently, control unit 62 may modified or filter individual content elements, or may drop the entire advertisement.

Control unit 62 stores topology information base 50, forwarding information base 58 and policies 80 on one or more computer-readable media, such as a magnetic medium, optical medium, non-volatile random access memory (NVRAM), dynamic random access memory (DRAM), FLASH memory, or the like. Furthermore, control unit 62 may maintain the data in the form of a variety of data structures, such as tables, radix trees, flat files, and on or more databases.

The architecture of router 60 illustrated is illustrated for exemplary purposes only. The invention is not limited to this architecture. In other embodiments, router 60 may be configured in a variety of ways. In one embodiment, for example, control unit 62 and its corresponding functionality may be replicated or otherwise distributed directly within IFCs 64.

Figure 7:
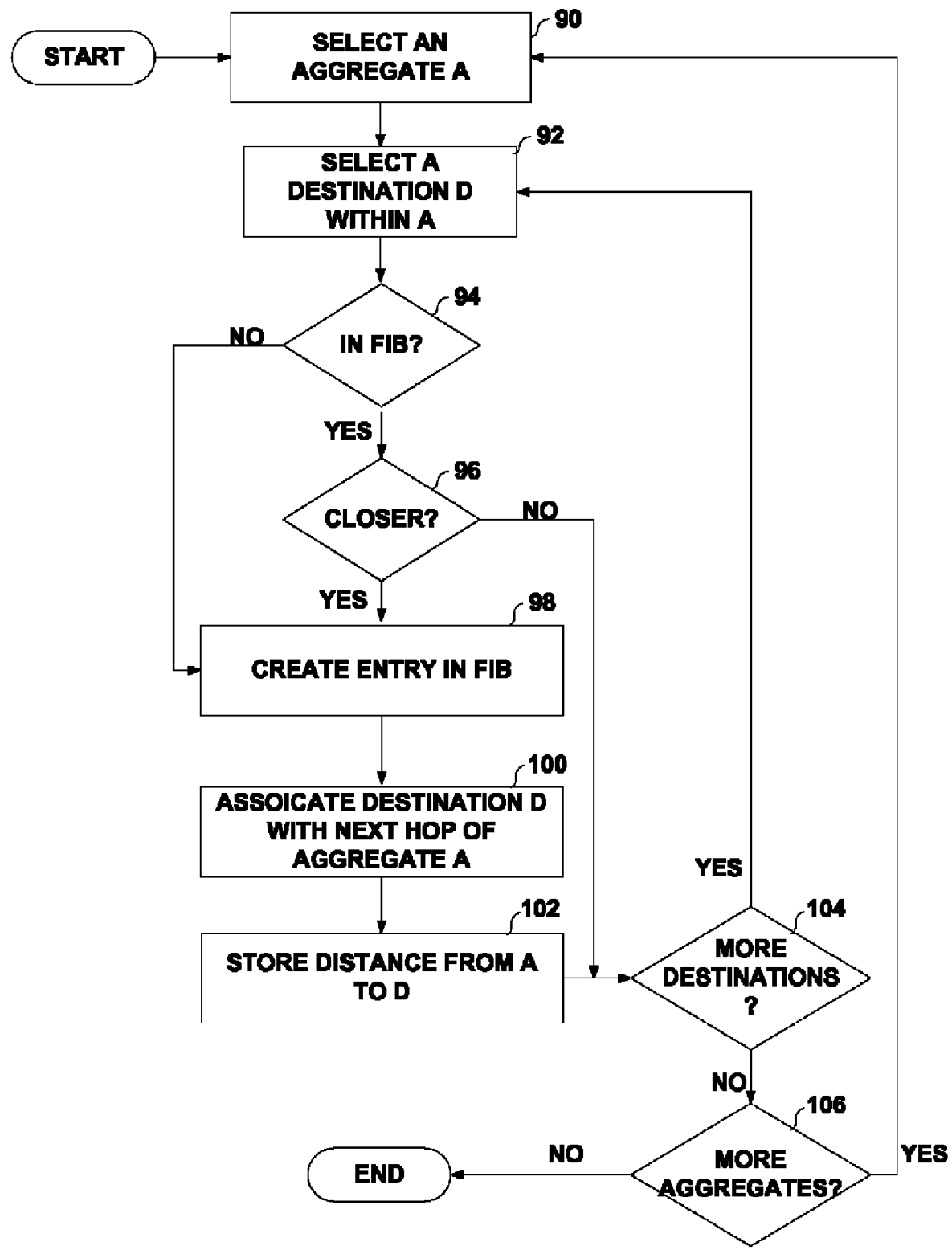
FIG. 7 is a flowchart further illustrating example operation of destination management module of the router in generation of a forwarding information base.

FIG. 7 is a flowchart further illustrating example operation of destination management module 74 in generation of FIB 78. In general, using the information in the TIB 70, destination management module 74 determines the next hop that is appropriate for each aggregate learned from peer ABRs, and makes an entry in FIB 78 for each destination contained in that aggregate.

Specifically, after topology management module 72 calculates the best next-hop to each aggregate, destination management module 74 selects an aggregate A from the set of known aggregates described within TIB 70 (90). Next, destination management module 74 selects a destination D associated with aggregate A via TIB 70 (92), and determines whether an entry already exists within FIB 78 for the destination D (94). For example, destination D may already have an entry corresponding to another aggregate.

If destination D already has an entry in FIB 78, destination management module 74 determines whether aggregate A is closer than a distance already associated with destination D via the current entry within FIB 78 (96). For example, aggregate A may be fewer hops from router 60 than the current aggregate associated with destination D in FIB 78.

If aggregate A is closer than the aggregate currently associated with destination D, or if no entry exists within FIB 78 for destination D, destination management module 74 creates an entry within FIB 78 (98). Specifically, destination management module 74 creates the entry to associate destination D with a next hop of aggregate A (100), and stores the distance from aggregate A to destination D (102). Destination management module 74 may, for example, insert into the newly created entry the forwarding tag for the destination ID association with destination D.

Other metrics may be used in place of, or to augment, the use of distance in selecting next hops for a destination. For example, a metric indicating a general preference for each aggregate may be used to aid route resolution.

Destination management module 74 repeats the process for each destination associated with aggregate A (104). Once processing all the destinations for the selected aggregate A, destination management module 74 repeats the process for all aggregates described via TIB 70 (106). In this manner, destination management module 74 generates FIB 78 from TIB 70 for use by control unit 62 during the packet forwarding process. In particular, control unit 62 receives inbound packets, and uses a portion of header information, referred to as a key, to perform a lookup in FIB 78 to determine appropriate next hop aggregates for the packets. Control unit 62 forwards the packets to output ports on IFCs 64 based on the determined next hop aggregates for the packets.

Figure 8:
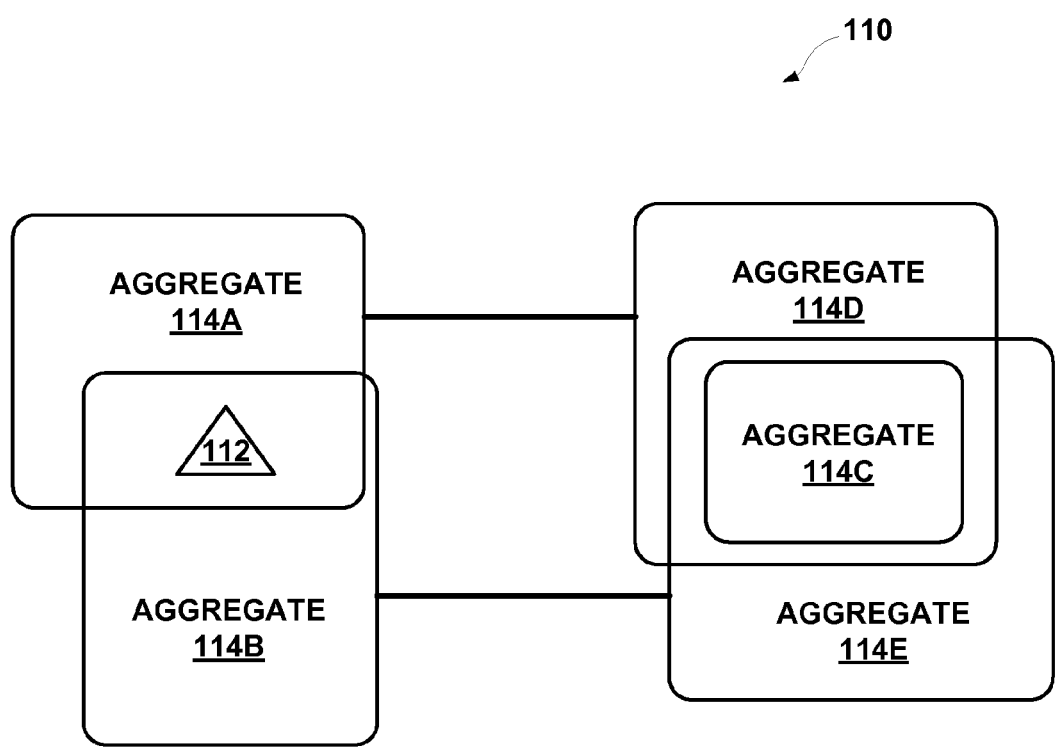
FIG. 8 is a block diagram illustrating an example network having multi-homed destination and a multi-homed aggregate.

FIG. 8 is a block diagram illustrating an example network 110 in which destination 112 and aggregate 114C are "multi-homed." In general, multi-homing occurs when a destination is contained in multiple parent aggregates, or when an aggregate is contained within multiple parent aggregates. For example, destination 112 is multi-homed in that it is contained within aggregates 114A, 114B. Similarly, aggregate 114C is multi-homed in that it is contained within aggregates 114D, 144E.

In both cases, the containing aggregate produces content advertisements that include the multi-homed destination or aggregate. The containing aggregate may include in the content advertisement an indication of which path the multi-homed destination or aggregate prefers. In general, all ABRs (not shown) of network 110 determine that there are multiple-paths to multi-homed destination or aggregate and build the topology graphs of their TIBs accordingly. When constructing their FIBs, each ABR selects one of the available paths to the multi-homed destination or aggregate, and installs the selected path in its FIB. When a connectivity problem occurs, the content advertisements indicate that the multi-homed destination or aggregate is no longer reachable via multiple paths, causing the ABRs to update their TIBs and regenerate their FIBs.

Various embodiments of the invention have been described. These and embodiments are within the scope of the following claims.

The invention claimed is:

1. A method comprising:
   receiving topological information specifying routes for reaching destinations within a set of aggregates that represent topological elements of a network, wherein the topological information defines a globally unique aggregate identifier for each of the aggregates and a destination identifier for each of the destinations encompassed by the aggregates, wherein the aggregate identifiers are allocated from a name space that is distinct from one or more name spaces for supporting different network layer protocols from which the destination identifiers are allocated, and wherein each of the destination identifiers includes a value allocated from the name space for the network layer protocol supported by the destination and a format identifier to identify the name space from which the value was allocated;
   generating forwarding information that associates the destinations with respective next hops within the network; and
   forwarding packets in accordance with the forwarding information.

2. The method of claim 1, wherein the topological information defines hierarchical relationships between the aggregates in accordance with topological relationships of the corresponding elements of the network.

3. The method of claim 1, further comprising generating a content advertisement for a router contained by one of the aggregates to communicate topological information for the containing aggregate to at least one peer router within another one of the aggregates.

4. The method of claim 3, wherein the containing aggregate comprises a parent aggregate having one or more child aggregates, and generating a content advertisement comprises generating the content advertisement to hide the existence of at least one child aggregate of the containing aggregate.

5. The method of claim 3, wherein the containing aggregate comprises a parent aggregate having one or more child aggregates, and generating a content advertisement comprises generating the content advertisement to incorporate topological information for lower-level aggregates within the topological information of the higher-level aggregates.

6. The method of claim 3, wherein the containing aggregate comprises a parent aggregate having one or more child aggregates, and generating a content advertisement comprises generating the content advertisement to combine topological information of the parent aggregate and the child aggregates into a single content advertisement for the parent aggregate.

7. The method of claim 3, wherein the content advertisement defines at least one destination contained within multiple aggregates.

8. The method of claim 7, wherein the content advertisement includes a preference indicator specifying a path-selection preference for one of aggregates.

9. The method of claim 3, wherein the content advertisement defines at least one aggregate as contained within multiple aggregates.

10. The method of claim 3, wherein the content advertisement defines a preference indicator specifying a path-selection preference for one of aggregates.

11. The method of claim 3, wherein the containing aggregate comprises a parent aggregate having one or more child aggregates, the method further comprising:
    receiving with the router content advertisements from the child aggregates; and
    externally forwarding via the router of the parent aggregate the content advertisements received from the child aggregates.

12. The method of claim 1, wherein generating the forwarding information comprises generating the forwarding information to exclude the aggregate identifiers.

13. The method of claim 1, wherein each of the destination identifiers is globally unique.

14. The method of claim 1, wherein each of the aggregate identifiers includes a partition field identifying a current partition associated with the respective aggregate.

15. The method of claim 1, wherein the destination identifier includes a forwarding tag for use as an identifier when forwarding packets to the respective destination.

16. The method of claim 15, wherein the destinations comprise local networks, and the values for destination identifiers comprise network prefixes.

17. The method of claim 16, wherein the network prefixes conform to at least one of the Internet Protocol version 4 (IPv4) and the Internet Protocol version 6 (IPv6).

18. The method of claim 1, further comprising:
associating each aggregate with a corresponding digital credential; and
digitally signing the content advertisements for the aggregates using the digital credentials associated with the respective aggregates.

19. The method of claim 1, further comprising storing the topological information within a topology information base.

20. The method of claim 19, wherein storing the topology information comprises storing the topology information within the topology information base to describe routes for reaching the aggregates.

21. The method of claim 19, further comprising processing the topology information to select next-hops for reaching each of the aggregates, and updating the topology information base to associate the selected next-hops with the respective aggregates.

22. The method of claim 19, wherein storing the topology information comprises storing the topology information as a link-state graph having nodes that represent the aggregates of the network, and arcs between the nodes that represent peering relationships between the aggregates.

23. The method of claim 1, further comprising:
identifying a set of the destinations listed within multiple aggregates by the topology information; and
resolving the identified destinations to respective next hops in accordance with a set of policies.

24. The method of claim 1, wherein generating the forwarding information comprises:
creating an entry within a forwarding information base for each destination contained within at least one of the aggregates;
determining the closest aggregate for each destination;
selecting a next hop within the network for each destination based on the determined closest aggregate; and
updating the entry for each destination to associate the selected next hop with the destination.

25. A router comprising:
a topology management module to receive topological information specifying routes for reaching destinations within a set of aggregates that represent topological elements of a network, wherein the topological information defines a globally unique aggregate identifier for each of the aggregates and a destination identifier for each of the destinations encompassed by the aggregates, wherein the aggregate identifiers are allocated from a name space that is distinct from one or more name spaces for supporting different network layer protocols from which the destination identifiers are allocated, and wherein each of the destination identifiers includes a value allocated from the name space for the network layer protocol supported by the destination and a format identifier to identify the name space from which the value was allocated;
a destination management module to generate forwarding information that associates the destinations with respective next hops within the network; and
a control unit to forward packets in accordance with the forwarding information.

26. The router of claim 25, wherein the topological information defines hierarchical relationships between the aggregates in accordance with topological relationships of the corresponding elements of the network.

27. The router of claim 25, wherein the destination management module generates the forwarding information to exclude the aggregate identifiers.

28. The router of claim 25, wherein each of the destination identifiers is globally unique.

29. The router of claim 25, wherein each of the aggregate identifiers includes a partition field identifying a current partition associated with the respective aggregate.

30. The router of claim 25, wherein the topology information associates each aggregate with a corresponding digital credential, and the control unit digitally signs content advertisements using the digital credentials to communicate the topology information to peer routers.

31. The router of claim 25, wherein the topology management module generates a topology information base to store the topology information.

32. The router of claim 31, wherein topology management module generates the topology information base to describe available paths for reaching the aggregates in accordance with the topology information.

33. The router of claim 31, wherein the topology management module generates the topology information base as a graph having nodes representing the defined aggregates, and arcs representing physical links between the aggregates.

34. The router of claim 33, wherein the nodes include data to define the destinations encompassed by the respective aggregate associated with the node.

35. The router of claim 31, wherein the topology management module processes the topology information to select next-hops for reaching each of the aggregates, and updates the topology information base to associate the selected next-hops with the respective aggregates.

36. The router of claim 31, wherein the topology management module organizes the topology information base as a link-state graph having nodes that represent the aggregates of the network, and arcs between the nodes that represent peering relationships between the aggregates.

37. The router of claim 25, wherein the destination management module creates an entry within a forwarding information base for each destination contained within at least on of the aggregates, determines the closest aggregate for each destination, selects a next hop within the network for each destination based on the determined closest aggregate, and updates the entry for each destination to associate the selected next hop with the destination.

38. The router of claim 25, wherein the topological information defines identifiers for the aggregates that include a partition field, and wherein the control unit updates the partition field in response to a network event to partition one of the aggregate into two or more new aggregates.

39. The router of claim 25, further comprising a policy management module to maintain a set of defined policies, wherein the destination management module generates the forwarding information in accordance with the set of policies.

40. The router of claim 39, wherein the policies includes at least one filter to selectively limit the forwarding of one or more packet flows between the aggregates.

41. The router of claim 39, wherein the policies includes at least one preference to preferentially select the specified aggregate as a next hop for at least one of the destinations.

42. The router of claim 39, wherein the policies includes at least one filter to limit the destinations for which at least one of the aggregates will provide transit service.

* * * * *

UNITED STATES PATENT AND TRADEMARK OFFICE
CERTIFICATE OF CORRECTION

| | | |
|---|---|---|
| PATENT NO. | : 7,940,763 B1 | Page 1 of 1 |
| APPLICATION NO. | : 12/104134 | |
| DATED | : May 10, 2011 | |
| INVENTOR(S) | : Frank J. Kastenholz | |

It is certified that error appears in the above-identified patent and that said Letters Patent is hereby corrected as shown below:

In the Claims

Column 18, line 42 (Claim 37), "base for each destination contained within at least on" should read
-- base for each destination contained within at least one --

Signed and Sealed this
Fourteenth Day of July, 2015

Michelle K. Lee
*Director of the United States Patent and Trademark Office*